United States Patent [19]
Dunn et al.

[11] Patent Number: 5,841,836
[45] Date of Patent: Nov. 24, 1998

[54] NETWORK TERMINATION EQUIPMENT

[75] Inventors: Anthony G. Dunn, Billericay; Jonathan J. Kingan, Ipswich, both of Great Britain

[73] Assignee: British Telecommunications public limited company, London, United Kingdom

[21] Appl. No.: 737,582

[22] PCT Filed: May 16, 1995

[86] PCT No.: PCT/GB95/01098

§ 371 Date: Feb. 11, 1997

§ 102(e) Date: Feb. 11, 1997

[87] PCT Pub. No.: WO95/32575

PCT Pub. Date: Nov. 30, 1995

[30] Foreign Application Priority Data

May 17, 1994 [GB] United Kingdom .................... 9409842
Aug. 17, 1994 [GB] United Kingdom .................... 9416597
Sep. 30, 1994 [EP] European Pat. Off. .............. 94307186

[51] Int. Cl.[6] .............................. H04M 3/08; H04M 1/00; H01R 21/00
[52] U.S. Cl. ............................ 379/29; 379/441; 379/442; 379/1; 439/44; 439/54
[58] Field of Search .................................. 379/1, 27, 29, 379/28, 30, 31, 32, 130, 131, 140, 141, 144, 442, 441; 439/912, 915, 43, 44, 54

[56] References Cited

U.S. PATENT DOCUMENTS

| | | |
|---|---|---|
| 3,976,849 | 8/1976 | Champan . |
| 4,807,277 | 2/1989 | Perry . |
| 4,870,679 | 9/1989 | Hanna . |
| 4,954,672 | 9/1990 | Ruehl . |
| 5,003,586 | 3/1991 | Wright . |
| 5,218,633 | 6/1993 | Clagett et al. ........................... 379/144 |
| 5,253,289 | 10/1993 | Tanaka . |
| 5,272,747 | 12/1993 | Meads ..................................... 379/144 |
| 5,652,575 | 7/1997 | Pryor et al. ............................... 379/29 |

FOREIGN PATENT DOCUMENTS

| | | |
|---|---|---|
| A2101980 | 2/1994 | Canada . |
| A0092084 | 10/1983 | European Pat. Off. . |
| A0212654 | 3/1987 | European Pat. Off. . |
| A0370423 | 5/1990 | European Pat. Off. . |
| A0519795 | 12/1992 | European Pat. Off. . |
| A0527072 | 2/1993 | European Pat. Off. . |
| A0573735 | 12/1993 | European Pat. Off. . |
| A3528281 | 2/1987 | Germany . |
| A3538698 | 5/1987 | Germany . |
| 9101675 | 7/1991 | Germany . |
| A4120110 | 12/1992 | Germany . |
| 9304272 | 5/1993 | Germany . |
| A4338452 | 5/1995 | Germany . |
| A2099260 | 12/1982 | United Kingdom . |
| A2198011 | 6/1988 | United Kingdom . |
| A2211695 | 7/1989 | United Kingdom . |
| A2242336 | 9/1991 | United Kingdom . |
| A2255694 | 11/1992 | United Kingdom . |

*Primary Examiner*—Paul Loomis
*Attorney, Agent, or Firm*—Nixon & Vanderhye P.C.

[57] ABSTRACT

A network termination equipment for connecting telecommunications apparatus to a telecommunications network has operative elements to perform terminal functions. The termination may perform line diagnostic functions, remote telemetry functions. Alternative front plates are connectable to intermediate plate to configure the termination equipment to perform the different functions necessary for additional services or to control access to the network to authorized users only.

32 Claims, 7 Drawing Sheets

NETWORK TERMINATION EQUIPMENT

BACKGROUND OF THE INVENTION

1. Field of the Invention

This invention relates to network termination equipment for connecting telecommunications apparatus such as telephones, fax machines, computer modems etc to a telecommunications network.

2. Related Art

As the range of services available over telephone networks increases, the number of functions required to be performed at the network termination equipment increases correspondingly. The nature of the network termination, and the functions it is required to perform, depend on the service to be provided. This leads to a number of problems.

Firstly, a customer requiring a new service may require a new function to be performed by the network termination. If the existing termination on the customer's premises cannot perform this function it must be replaced by a different design of termination. This usually requires a visit from a technician in order to replace the termination equipment. This makes the introduction of a new service inconvenient for both the service provider and the customer.

Furthermore the physical connection available for the installed termination may be incompatible with the connection required for the new equipment, requiring the replacement of the termination equipment.

Even were it possible to provide a termination equipment having all the functionality necessary for all present and future requirements, such an equipment would be unnecessarily complex, which would adversely affect its cost, reliability and physical size, since for most customers only a few services from the total available would be required.

There is thus a need for a network termination equipment which can readily be upgraded to provide additional services.

United Kingdom patent specification GB2255694 describes a termination in which alternative front plates, carrying socket types which differ in the relative physical positions of their electrical connections, can be fitted to allow accommodation of different plug types. This allows ready adaptation of the termination for different equipment for supporting different services.

However, this is of limited utility because the signals to be transmitted over the network must be compatible with any equipment which may be connected to the termination, and so each alternative front plate merely provides a number of direct connections between the network connection and the socket terminals.

European patent specification EP 0370423 A2 (Walter Rose) and Canadian patent specification 2101980 (Dresser) both disclose termination devices for telecommunications systems which include functionality to allow interaction between the exchange and the termination allowing transmission of signals to the exchange, for diagnostic and other purposes.

SUMMARY OF THE INVENTION

According to the invention, there is provided telecommunications equipment, comprising a network termination equipment for forming the physical termination of a telecommunications network and providing a connection by which a user can access the network by use of telecommunications apparatus, the network termination equipment having a first connection point for making connection with the head end of a telecommunications network, at least one second connection point for making connection with a telecommunications apparatus, operative means for generating signals for transmission to the head end and a further connection arranged to allow the connection of different complementary elements, such that the topology of the connection of the elements can be varied to allow the network termination to perform different functions.

This allows for much greater flexibility in the type of services which may be provided. The signals transmitted to the head end may be used to indicate the presence of the complementary elements, which information can be used by the head end to determine what type of service the termination is configured for.

Preferably, the equipment has means for signaling the presence of the complementary element to a telecommunications network through the first connection.

In another aspect the invention comprises a telecommunications equipment comprising a complementary element for use with such a network termination equipment, and having connections arranged such that when connected to the connections in the network termination equipment they together form a complete connection between the first and second connection points.

In a further aspect the invention comprises a combination of such a network termination equipment with such a complementary element.

In a preferred arrangement the complementary element comprises additional connection points for connecting further telecommunications apparatus.

The complementary elements may include additional components for performing additional terminal functions, and additional connection points for making electrical connection with further telecommunications apparatus.

The complementary elements may include means for reconfiguring the functional means in the terminal equipment for performing terminal functions, for example to enable or disable it.

By allowing the reconfiguration of the termination equipment by simply adding different complementary elements the basic equipment can be kept simple, whilst allowing reconfiguration for more complex functions as required. New complementary elements may be devised for previously unforeseen technical requirements, which can be provided without modification of the basic termination equipment. In addition the termination equipment need not be made unnecessarily bulky in order to accommodate equipment such as card readers which only a minority of customers require.

Means may be provided to prevent or detect unauthorized disconnection of telecommunications equipment from one or more of the second connection points.

Means may be provided for providing a characteristic terminal signature to the first connection point, or for controlling use of the telecommunications. This means may be a user identification means such as a card reader. Further means may be provided for responding to control instructions received at the first connection point. This may comprise means for transmitting control instructions to one of the second connection points in order to control further equipment, and may further comprise means for receiving data from the further equipment in response to the control instructions and transmitting the data from the first connection point. The apparatus may be configured to interrogate and retrieve data from a meter, such as a gas or electricity meter, to allow remote telemetry of a consumer's energy consumption. A visible indicator of the presence of the line voltage supplied to the first connection may be provided. The indicator may be a light-emitting resistor connection across the first electrical connection.

Means may be provided for identifying the type of signal received at the first electrical connection, and means for processing the signal according to the type. The processing means may include means for routing the signal to one of a plurality of second electrical connections according to the type of signal identified.

These features may be provided in one or more of the configurations of the equipment by being provided in either the network terminating element or the complementary element.

According to a further aspect of the invention, there is provided a telephone network having a plurality of terminations at least one of which includes equipment of the above kind, means for identifying a call attempt from one of the terminations, means at the head end for identifying a characteristic signature transmitted from a network termination according to any preceding claim, and means for enabling the call attempt only if the characteristic signature is present. The network may further comprise means for identifying whether a call attempt is in a predetermined permitted category, and means for enabling the call attempt if it is in that category irrespective of the presence or absence of the characteristic signature. The network may also comprise charging means for calculating call charges for billing to an account holder, having means for responding to a signal from the network termination identifying the type of user, and means for selectively activating the charging means for a first type of user only. The network termination may include a user identification means, having means for identifying a first type of user for which an account is held, and a second type of user to be charged at the point of use. The user identification means may be a card reader, which may have means for reducing the value stored on a stored value card as a call progresses.

According to another aspect of the invention, there is provided a telephone network having a plurality of lines each leading to a termination, at least one of the terminations having a diagnostic apparatus, the network having means for signaling to the diagnostic apparatus to test the properties of the line leading to it. The diagnostic apparatus may include means for generating a terminal signature and the network may include means for testing for the presence of the signature.

Terminal functions may be provided in either the basic termination equipment or one of the complementary units to be supplied as required. If the terminal functionality of the basic equipment is incompatible with those of the complementary unit the complementary unit may include means to disable that functionality or modify it.

Certain connections to the telecommunications system need to be arranged such that disconnection is prevented or at least detectable. These include connections for account-management units (payphones etc) and telemetry connections for allowing utilities to interrogate gas, electricity etc meters through the telephone connection. Such connections may be made lockable, or protected by seals, or a 'signature' may be generated by the termination equipment or one of the complementary units, the network being programmed to react according to the presence or absence of the 'signature' on that line.

BRIEF DESCRIPTION OF THE DRAWINGS

Embodiments of the invention will now be described in more detail, by way of example, with reference to the drawings, in which.

DETAILED DESCRIPTION OF EXEMPLARY EMBODIMENTS

Figure 1:
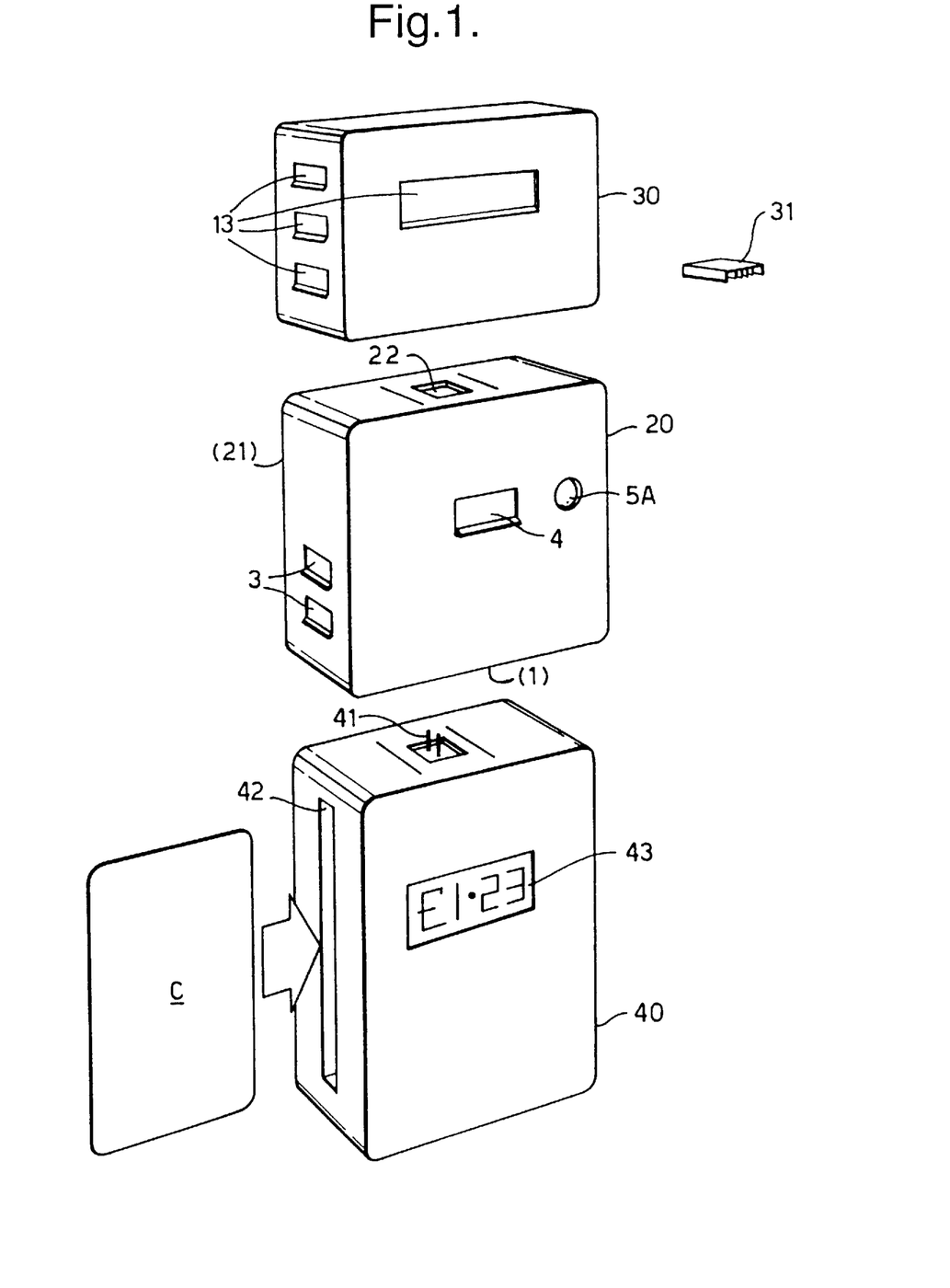
FIG. 1 is a general view of a network termination equipment and three complementary units according to the invention.

Referring to the drawings, FIG. 1 shows a network termination equipment (NTE) 20 and three complementary units: an additional services unit 30, a blanking unit 31, and a card reader unit 40. The NTE 20 is provided with a connection point 21 (concealed) to a telecommunications network (not shown) and with a number of sockets: a card reader socket 1, a telemetry socket 3, a conventional telephone socket 4, and an auxiliary socket 22, and with an indicator light 5a. The auxiliary socket 22 is for connection of either of the additional services unit 30 or the blanking unit 31, and the card reader socket 1 is for connection of the card reader unit 40. The additional services unit 30 has further telephone sockets 13. The telephone sockets 4, 13, are constructed appropriately for connection of telecommunications apparatus such as telephones, computer modems, etc, using suitable plugs. For example they may be BT jacks (type 601 A) for use with plugs according to British Standard BS6312:1985.

The card reader unit 40 has a connection point 41, a card reader slot 42 for inserting a chargecard C, and a digital display 43 for displaying charging information.

Figure 2:
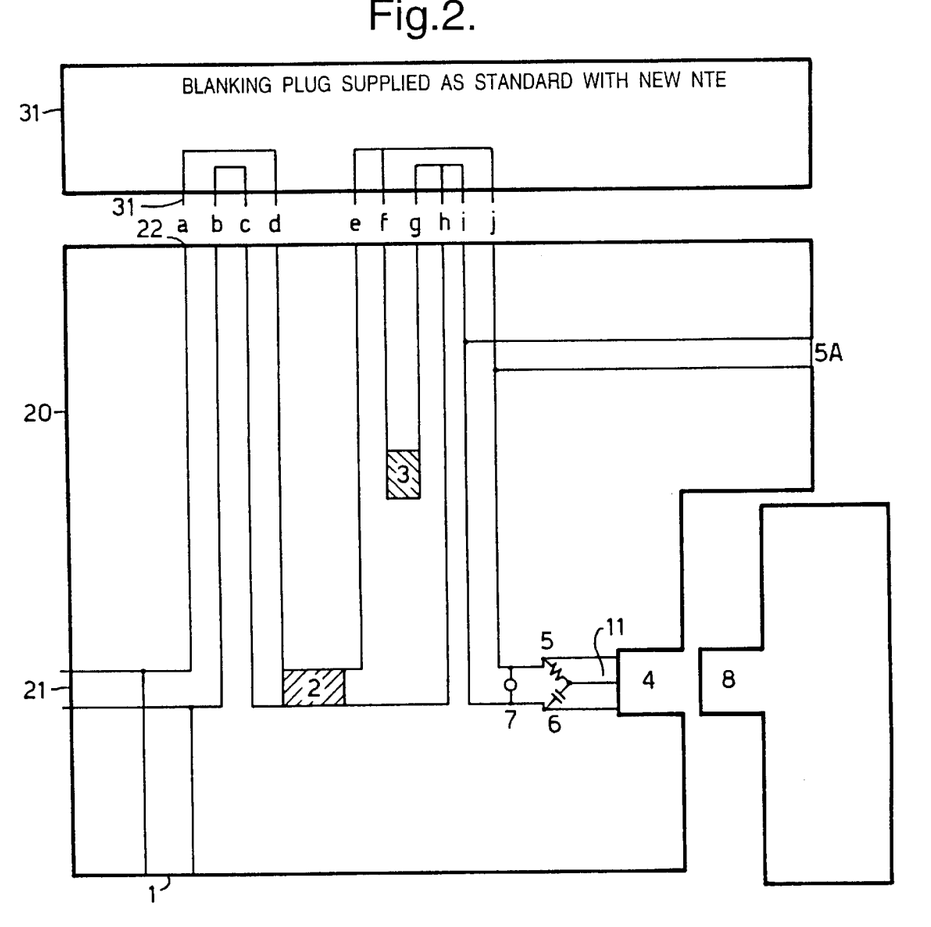
FIG. 2 is a simplified electrical diagram of a network termination equipment and a first complementary unit.
Figure 3:
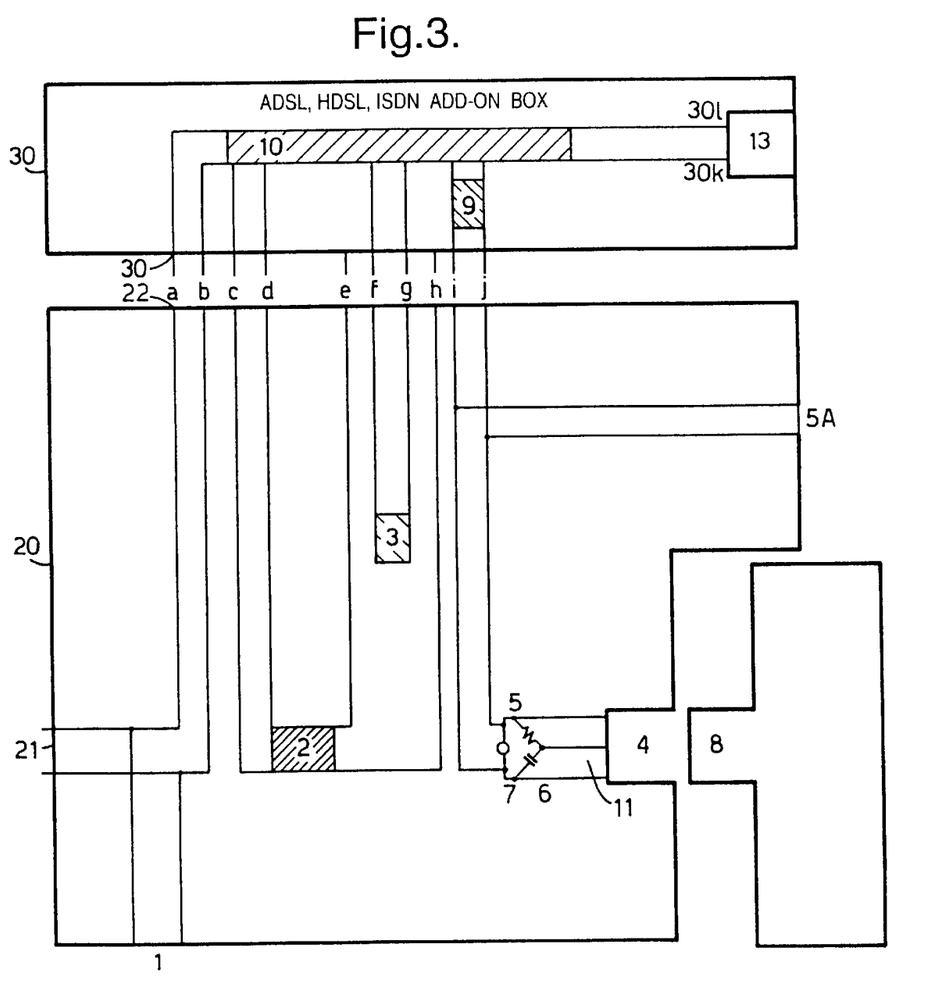
FIG. 3 is a simplified electrical diagram of the same network termination equipment with a second complementary unit.

FIGS. 2 and 3 show the NTE 20 in greater detail, and in combination respectively with the complementary units 30, 31. The blanking unit 31 is provided only in order to complete the circuits in the NTE 20, and is replaceable by the additional services unit 30 if the extra functionality offered by this unit is required by the customer.

The auxiliary socket 22 has ten electrical connectors (22a to 22j) which are connected together in different configurations by the electrical connections in the units 30, 31, which have complementary connectors 30a to 30j, 31a to 31j which connect with the connectors 22a to 22j respectively.

A wire pair is led from the connection point 21 to the connectors 22a, 22b with a branch to the card reader socket 1. The blanking unit 31 provides a connection from the connector 31a to the connector 31d, and from the connector 31b to the connector 31c. The connectors 22c and 22d are connected within the NTE 20 to a diagnostic chip 2 which is in turn connected to the connectors 22e, 22h. The blanking unit 31 connects together the connectors 31e, 31f and 31j; and similarly the connectors 31g, 31h and 31i.

Figure 4:
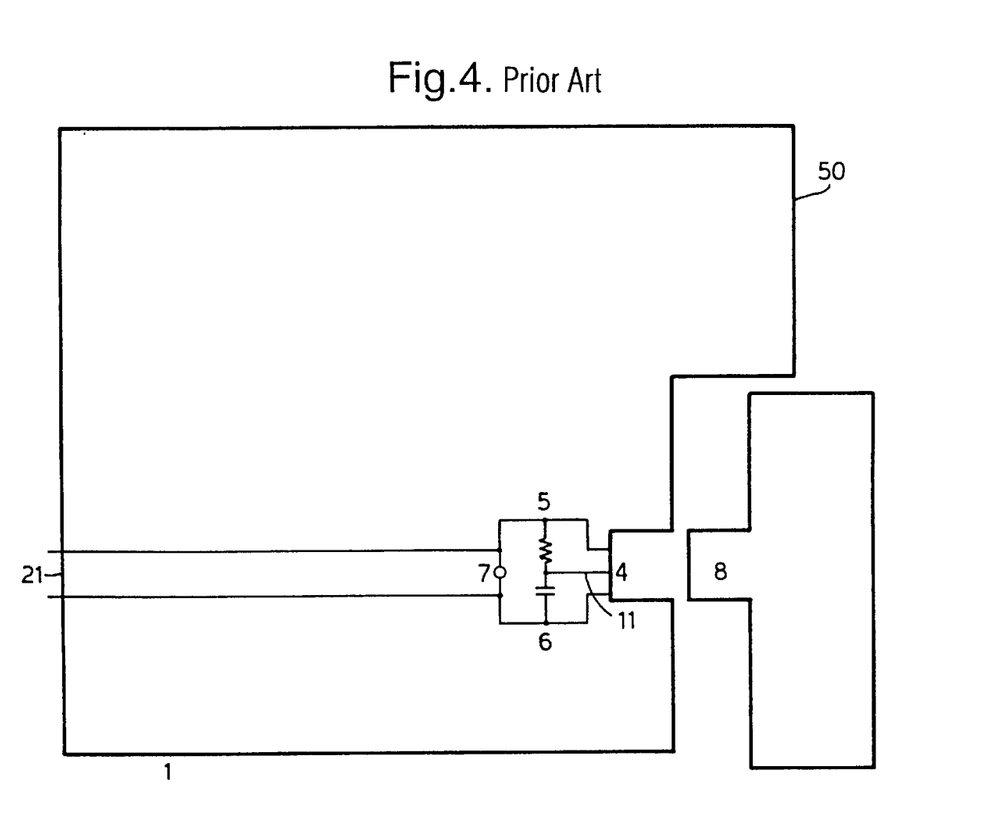
FIG. 4 is a simplified electrical diagram of a prior art network termination equipment.

In the NTE 20, the connectors 22f, 22g lead to a telemetry service socket 3, and a wire pair leads from the connectors 22i, 22j to a conventional telephone socket 4, via a conventional circuit including a resistor 5, a capacitor 6 and a gas discharge tube 7 connected across the wire pair in known manner (see FIG. 4). A service indicator light 5A is also connected across the wire pair. The telephone socket 4 allows the connection of a conventional telephone plug or adaptor 8.

The circuit formed by the units 20 and 31 thus comprises a wire pair leading from the connection point 21 to the telephone socket 4, through the diagnostic chip 2. Branches lead to the card reader socket 1 and auxiliary socket 22 and to the service indicator light 5A.

In the additional services unit 30, the electrical connectors 30a to 30j are different from those in the blanking unit 31, thus providing a different circuit configuration. In the additional services unit 30 there is provided an adaptation unit 10 for providing the necessary functionality for an additional service. This includes the functionality necessary to identify whether an incoming call is for the additional service or for simple telephony and routing it to the appropriate telephone socket 13 or 4.

The connectors 30a, 30b provide an input to the adaptation unit 10. This unit 10 has four output connector pairs 30c and 30d, 30f and 30g, 30i and 30j, and 30k and 30l. The first pair of connectors 30c, 30d connect with the connectors 22c, 22d which lead to the diagnostic chip 2 in the NTE 20. Secondly, output connector pair 30f, 30g connects with the telemetry service socket 3 in the NTE unit 20 though the connectors 22f, 22g. Thirdly, the connectors 30i, 30j connect via a terminal adapter 9 to the connectors 22i, 22j connected to the telephone socket 4. Finally, the connection 13 (the connector pair 30k, 30l) is a socket for the additional service apparatus. The connectors 22e, 22h in the NTE unit 20 are connected to blind connectors 30e, 30h.

The circuit topology in FIG. 3 is, therefore, different from that in FIG. 2. In particular, it will be noted that the diagnostic chip 2 is in parallel with the socket 4 instead of in series with it as in FIG. 2, and that an additional branch is provided (the telephone socket 13).

For comparison, a conventional NTE unit 50 is shown in FIG. 4. The components 4, 5, 6, 7, 21 have the same identities as in FIGS. 1 to 3.

The resistor 5 has a high resistance which limits the current that passes through the connection point 21. This high resistance indicates to the network that the line is not in use. If a telephone plugged into the telephone socket 4 is taken off-hook, this causes completion of a circuit having a lower resistance and the resulting increased current is identified by the network as an indication that the line is in use. The capacitor 6 allows the passage of ringing current (a.c.) to connection 11, whilst maintaining the line resistance to d.c. The gas discharge device 7 protects the telephone apparatus 8 from electrical surges which may occur in the network as a result of faults, lightning strikes, short circuits etc.

The NTE 20 is provided by the telecommunications operator, and is permanently connected to the network via the connection point 21. The blanking unit 31 is provided with it and serves to configure the network termination as a conventional telephone socket. To the user, the only differences from a conventional telephone socket are the service indicator 5A, which indicates whether the line is live, the extra sockets 1, 3, 22 and the blanking unit 31. The blanking unit 31 may take the form of a plug shaped to fill the space defined by the auxiliary socket 22, as shown in FIG. 1.

However, a number of additional functions are performed by the NTE 20 which are not apparent to the user. Firstly, there are the functions performed by diagnostic chip 2. This can perform the following functions:

a) Line Loop/Break

A line loop/isolation is provided, triggered from the network controller. This would have the following possible benefits:

Network demarcation: The line isolation function would allow the operator to test the pair with the customer wiring disconnected. This may significantly reduce the number of customer visits required. Network demarcation is likely to become a much more important issue in the future, as new services are deployed.

Line characterization: if the network termination is disconnected from the line, then it is possible to measure the line capacitance accurately. Application of a loop allows the measurement of loop resistance. These parameters could be used to determine the suitability of a line for deployment of new technology.

Better fault diagnosis: the measurement above will allow better assessment of fault type, and may give better despatch accuracy.

b) Test Signal Generation

New technology, such as high bandwidth services, are starting to appear in the local access network. A common feature of introducing these systems is that they can only be deployed on a proportion of existing copper loops, but it is difficult to identify which loops are adequate. Significant advantages are possible by using an on-demand test, controlled from the head end, allowing a line to be assessed for suitability before the customer is offered service. Line attenuation is often the main limiting factor, and some form of signal generator at the NTE terminal equipment, which could be triggered by a line test signal (LTS), would allow lines to be characterized.

It is likely that a noise signal would be the most appropriate signal to use, as it can be generated simply and allows characterization of the line over a wide range of frequencies, making the measurement relevant for different transmission systems.

In addition, such a signal generator would give the potential for enhanced fault diagnostics.

The technical characteristics of a suitable system are described in the Applicant's co-pending International Patent Application No GB95/ , (Applicant's Reference A24809: claiming priority from UK Patent Applications 9409842.3 and 9416597.4, and European Patent Application 94307186.0.

(c) Pair identification

Some form of unique identifier which is transmitted from each termination equipment, and can be received by LTS, would have the following possible benefits:

I Ability to check local loop connectivity and integrity

Detection of inadvertent or malicious diversion of lines

Automatic updating of line records

The noise signal used for deployment assessment could be based on a pseudo-random bit sequence (PRBS) incorporating a low level spread-spectrum signal. This can be compared at the head end with a locally generated signal to assess line degradation.

(d) Bell-Tinkle Suppression

At present, bell-tinkle suppressors are fitted to some customers' lines when they complain about the effects of overnight line testing. Such a circuit could be incorporated into the chip 2 or could be implemented as an optional module (75, FIG. 7). This would give the advantage of using a series-connected device, which may give more effective suppression.

The diagnostic chip 2 will require some means of triggering, in order to enable the various functions during line testing. Typically this will involve the transmission of a signal from the LTS, which is received and acted on by the terminal equipment. The requirements of such a triggering circuit are that it should be robust (with little chance of false triggering from the wide variety of line conditions that may occur), inexpensive, and, in the case of a multi-function device, must support multiple triggering to select the various functions. The following options are possible.

(1) Not triggered

By avoiding the need for triggering, the cost of the device can be significantly reduced. However, the functions supported are only those which are transparent to all services to be offered; i.e, line loop, line break and signal generation would not be possible. Pair identification however could be supported.

(2) DC-level triggered

This is the simplest triggering technique, and relies on the fact that in normal operation of the analogue telephone service, voltages of around 35V do not appear on the line. The method is not particularly robust; battery-contact faults may cause false triggering. The use of this method would place restrictions on the range of normal line voltages that could be used in the future.

(3) Pulse-triggered

This provides a more robust method of triggering, where a dc voltage with respect to earth of around 130V is used. However, an earth connection is required at the termination equipment, and the use of such a voltage may restrict options for future line powering of new systems.

(4) Tone-triggered

Tone triggered detection could be via a single tone, or a dual tone similar to MF4 (multi-tone) signaling. In order to provide security against deliberate or unintentional misoperation, the frequencies used would have to be outside the voice band. The cost of a tone-detector is likely to be much higher than for dc or pulse detectors, although with high production volumes and integration onto silicon, this cost could be reduced. If multiple-triggering is required, then the complexity and cost will be significantly greater.

(5) Code-triggered

This is potentially the most versatile method of triggering, as it allows for multiple-triggering and the addition of extra codes in the future. There are two options to be considered:

(i) Imperceptible Signaling

Previous work has shown that it is possible to transmit and recover a low level signal which is imperceptible, and allows other services to be delivered simultaneously over the copper pair; this could give data transmission of a few bit/s. One advantage of this approach is that the termination equipment would not require initial triggering; the receiver could be continuously monitoring the line for the appropriate maintenance codes.

(ii) CLASS-type signaling

This would involve the use of the V.23 FSK signaling standard, which provides 1200 bit/s data transmission. Some form of initial triggering would be required to wake up the receiver; this could be a variant of the CLASS line-reversal/ tone alert signal. It is likely that microchips to support this functionality will become available at low cost, although this may only support the standard tone-alert. The security required to prevent unauthorized operation could be built in at the datalink layer of the protocol.

The "no-ring" or telemetry connection 3 allows telecommunications equipment which operates without customer action to be connected to the network. Examples are burglar alarm systems and telemetry applications for remote meter reading. In these systems the equipment to be monitored is connected to the telemetry socket 3. Signals can then be passed between the equipment and the network (and so to the service provider) without the intervention of the customer. In one application the service provider transmits a signal to interrogate a meter (e.g. an electricity meter) connected to the telemetry socket 3. The meter transmits a signal back corresponding to the current meter reading. Any processing of the telemetry signals required at the termination unit can be performed by the chip 2.

To ensure these readings are not falsified or otherwise tampered with it may be a requirement of the service provider that the connections to the monitoring or metering equipment are secured against tampering. This may be done by means of a lockable connection or a tamper-revealing device such as a seal which must be broken to gain access to the socket 3.

If a customer requires additional service such as ISDN (Integrated Services Digital Network), ADSL (Asymmetrical Digital Subscriber Line) or HDSL (High Bit-Rate Digital Subscriber Line) additional functionality is required in the network termination to support it. Moreover, a different socket connection 13 may be necessary. However, all these services can be provided over conventional telephone wire pairs. If the customer network transmission is a conventional network termination such as that shown in FIG. 4, a technician must replace it with a new termination. This is inconvenient since it requires a technician to visit the customer's premises, which can be inconvenient for both parties. By adopting the modular approach of this invention, the existing termination can be modified by the customer without interfering with the network connection 21. The additional services unit 30 can be collected by, or delivered to, the customer and be used to replace the blanking unit 31 by the customer himself by simply unplugging the blanking unit 31 and plugging in the additional services unit 30.

This new additional services unit 30 incorporates the additional module 10 which provides the necessary functionality to identify and route traffic according to its nature (e.g. ordinary analogue telephony, through adaptor 9), additional services (through one of the telephone sockets 13), telemetry (through the telemetry socket 3) or diagnostic (through chip 2).

Since telephony traffic on an ISDN-configured line is digitized it cannot be identified by the diagnostic chip 2. For this reason the connections 22e, 22h, from the chip 2 are disabled by being connected to 'blind' connections 30e, 30h. Telephony is identified by the adaptation unit 10 and passed to the digital-analogue convertor 9, from which it is transmitted through connections 30i/22i, 30j/22j to the telephone socket 4.

The relative dispositions of the units are a matter of design choice. As shown in FIG. 1 the additional services unit 30 and card reader unit 40 each have their own connections to the base unit 20. These units 30, 40 may have additional sockets provided to allow additional modules to be attached. When not in use these sockets may be closed by a blanking plug in the same manner as described above with reference to plug 31. The connections to the additional socket may be configured so that the same blanking plug 31 can be used.

The embodiment described above allows a very simple construction of termination for those customers only requiring basic telephony service, with additional modules being coupled to the base unit for more advanced services. However, this arrangement has a number of practical problems. Firstly, the blanking plug 31, needed in order to complete the electrical connections in the base unit and to provide environmental protection for the interior of the base unit, would be easily lost because of its small size.

Secondly, because of the number of connection points provided on the base unit it would be difficult to find suitable mounting locations. Conventional termination units are usually mounted on a wall, near the floor and often adjacent to a corner. Such locations are precluded if additional modules may need connection to the side or bottom faces at some future time.

There is also a high cost content in unused connection points, and their use must be defined at the initial design stage, limiting the design of future services.

An alternative embodiment which overcomes these problems is described below with reference to FIGS. 6 and 7. In this arrangement the addition or removal of a new service requires the replacement of one plug-in module by another, in contrast to the first embodiment where each service has its own additional plug-in module. This overcomes the problems discussed above, although it requires more types of modules to be available, namely one for each potential combination of services, instead of just one for each service.

This arrangement consists of a back box 70, an intermediate unit 71, interchangeable front plates 72, 73 or 74, and an access panel 84. The back box 70 is designed to be secured to a wall, or sunk into a wall to reduce the size of the projecting part.

Figure 6:
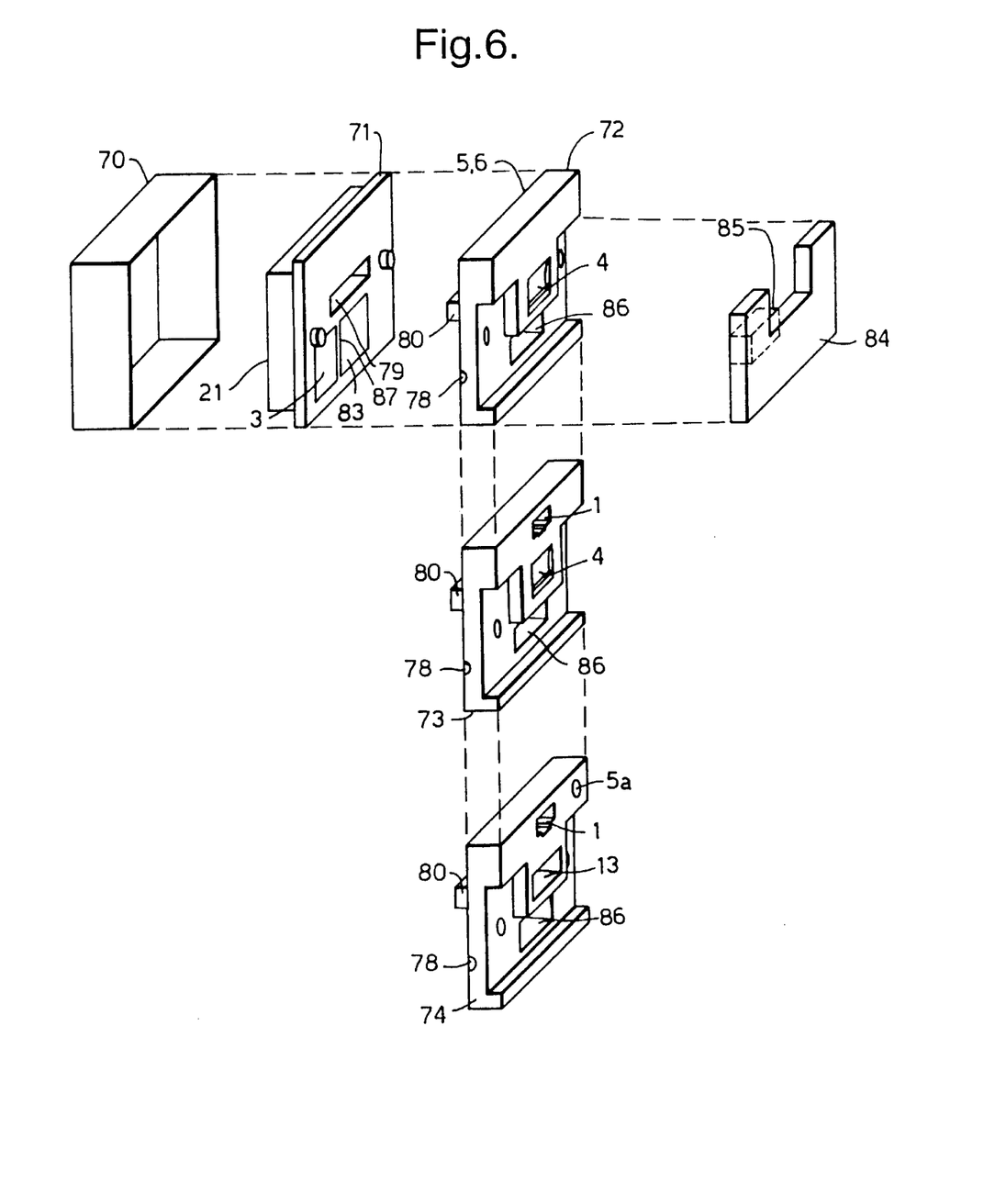
FIG. 6 is a general view of an alternative arrangement of network termination equipment and complementary units.
Figure 7:
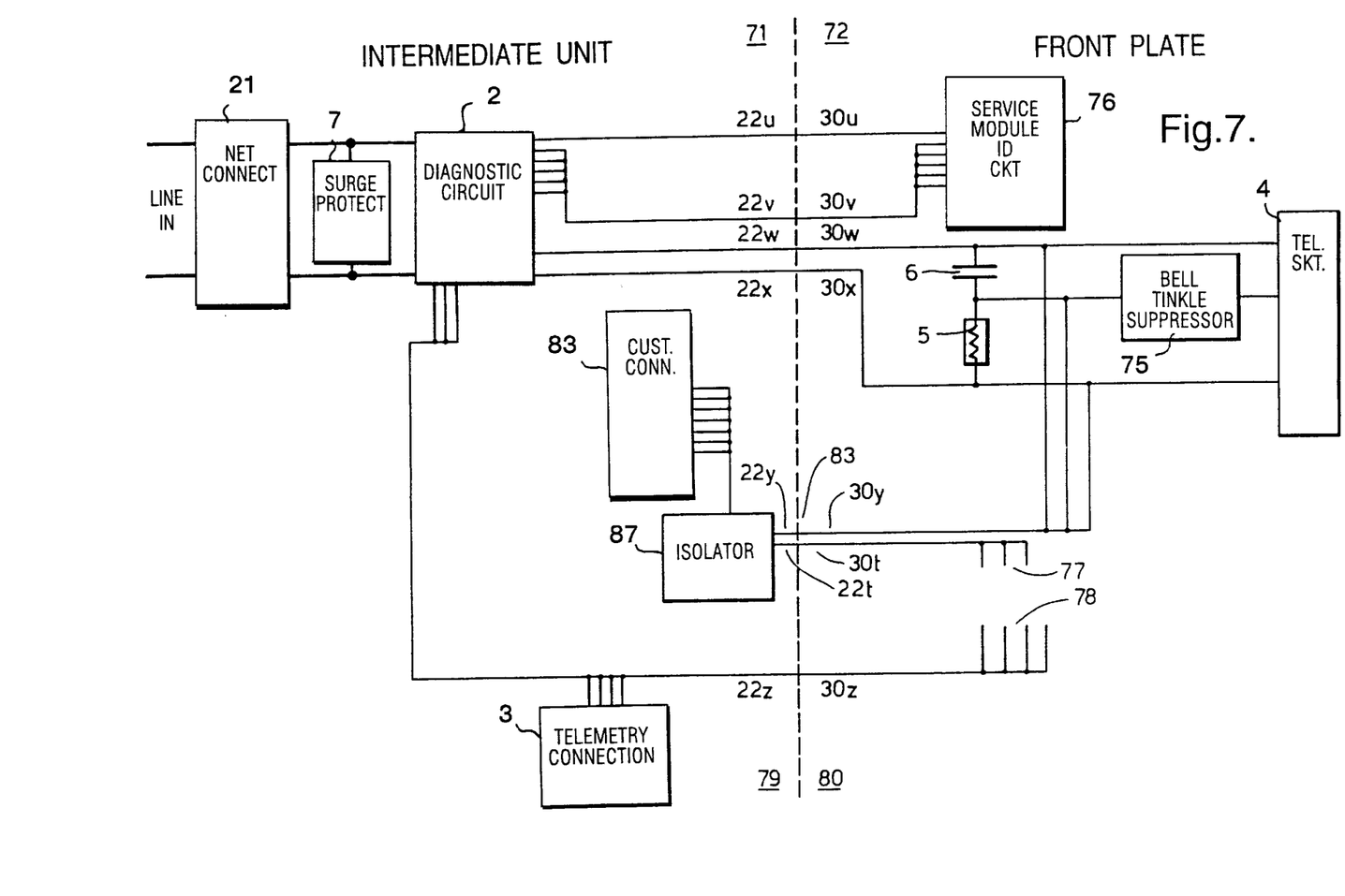
FIG. 7 is a simplified electrical diagram of the alternative network termination equipment in one of its configurations.

The intermediate unit 71 fits into the back box 70 and holds:

the connection 21 to the telecommunications network the diagnostic chip 2, (concealed in FIG. 6)

connection points 83 for extension wiring, a multiway socket 79 to enable the front plate 72, 73 or 74 to be plugged in. This plate allows various connections to be made to different front panels as and when required.

the metering connection point 3.

The interchangeable front plates 72, 73 and 74 which are service or services-specific fit into the intermediate plate 71 by means of a multiway connector 79, 80. The front plates either have leads going away from them or a combination of sockets. If the service electronics can be made small enough then may be mounted in the front plates 72, 73, 74.

A number of different front plate designs are required, and more can be designed as service requirements change. A first plate 72 provides a telephony socket 4. The capacitor 6 and resistor 5 can be provided in this plate or in the back box 70. Positioning them in the plate 72 would simplify some of the connections required between the intermediate box 71 and the front plate 72.

The plate 73 includes an additional port 1 for a smart card reader, and the plate 74 includes a further port 13 for advanced broadband services. As a further variant from the first embodiment the service indicator 5*a* is provided on the front plate 74 instead of on the base unit.

In each of the front plates 72, 73, 74 there is provided a knock-out 78 for connecting a lead between metering equipment and the telemetry connector 3, or between an extension socket and the connector 83. Alternative knock-outs may be provided on other faces to allow more freedom in siting the termination equipment.

Further variant front plates may be made available for other services or combinations of services.

The enhanced services socket 13 enables an add on box to be plugged in; a service indicator could be mounted on the front plate 5*a* or on the add on box.

An access panel 84 is provided. This is provided with an isolation jumper plug 85 which gives access through an aperture 86 in the front plate 72, 73, 74 to isolation jumper 87 located in the intermediate plate 71.

The electrical connections for this embodiment will now be discussed with reference to FIG. 7, which shows the intermediate plate 71 and the front plate 72 for use with simple telephony.

The socket 79 has six electrical connections $22t$ to $22z$ which connect with complementary connections $30t$ to $30z$ in front plate 72. Similar connectors in front plates 73, 74 allow different functionality to be provided by reconfiguring the completed circuitry. In this embodiment connection $22v/30v$ is a five-wire connection, connections $22t/30t$ and $22y/30y$ are each three-wire connections, and connection $22z/30z$ is a four-wire connection.

The network connection 21 is connected to the intermediate unit 71 through a surge protection device 7 and then to the diagnostic circuit 2. For normal telephony a connection is made to a telephone socket 4 through multi-way connector 79, 80, using connections $22w$, $30w$; $22x$, $30x$; and the conventional resistor 5 and capacitor 6 as described above. In this embodiment a bell-tinkle suppressor 75 is provided in the front plate 72: this allows small test currents to be transmitted over the telephone circuit without causing operation of the telephone bell.

A six-way connection $22u,v$ allows for connection of a service module identification circuit. The service module identification circuit 76 is configured according to the type of front plate 72, 73, 74 in which it is provided, in that connection $30u$ is connected to none, one, or more of the five other connections $30v$. In this way $32$ ($2^5$) different types of front plate can be identified to the diagnostic unit. In an alternative arrangement the connections $22u/30u$ and $22v/30v$ may be mechanical links operating switches in the circuitry of the intermediate unit 71.

A six-way customer connection 83 is provided in the intermediate unit 71. This allows connection of extension circuits by the customer. It is connected to the telephone circuit connections $30w$, $30x$ by connections $30y$, $22y$ in order to allow the bell circuit components 5, 6 to be utilized. Moreover, in some configurations the front plates (e.g. front plates 73, 74) include other functionality necessary for the correct operation of the telephony circuit, such as the connection 1 to a card-reader or the means for discrimination a high-bandwidth service from a simple telephony call. An isolator 87 allows disconnection of the wiring for test purposes. This is achieved by means of a disconnect plug 85 in the wiring access panel 84.

Spare connections $22t$ are provided in the intermediate plate 71 for use with further front plates e.g. 73, 74 requiring different configurations. In the front plate 72, however, these connections are connected to blind connections 77 through connectors $30t$.

Finally, a telemetry connection 3 is connected to the diagnostic circuit 2. The wires of this connection are also extended to a connection $22z$ with the front plate 80 (connection $30z$) which is blind (78) in the case of plate 72 but they may be connected to a telemetry connection in an alternative front plate (not shown).

This embodiment has various advantages:

There are no superfluous sockets requiring blanking plugs or gel sealing.

The service provider would initially only provide the simple front plate 72. Other sockets would only be provided for those customers requiring the relevant service.

Different service providers, who may require different shaped sockets in the front plate for the same type of service, can all be supplied with the same design of intermediate and back plate, reducing manufacturing costs.

The main plug and socket are in a part of the box protected from the environment.

An unskilled user can easily change the front plate for any new service bought.

Future-proofing is achievable, in that the basic terminal, including the intermedite plate 71, can be used with different front plates to support new services whose detailed implementation have not been finalized at the time of installation of the terminal; indeed the service may not even have been contemplated at the time of installation.

Figure 5:
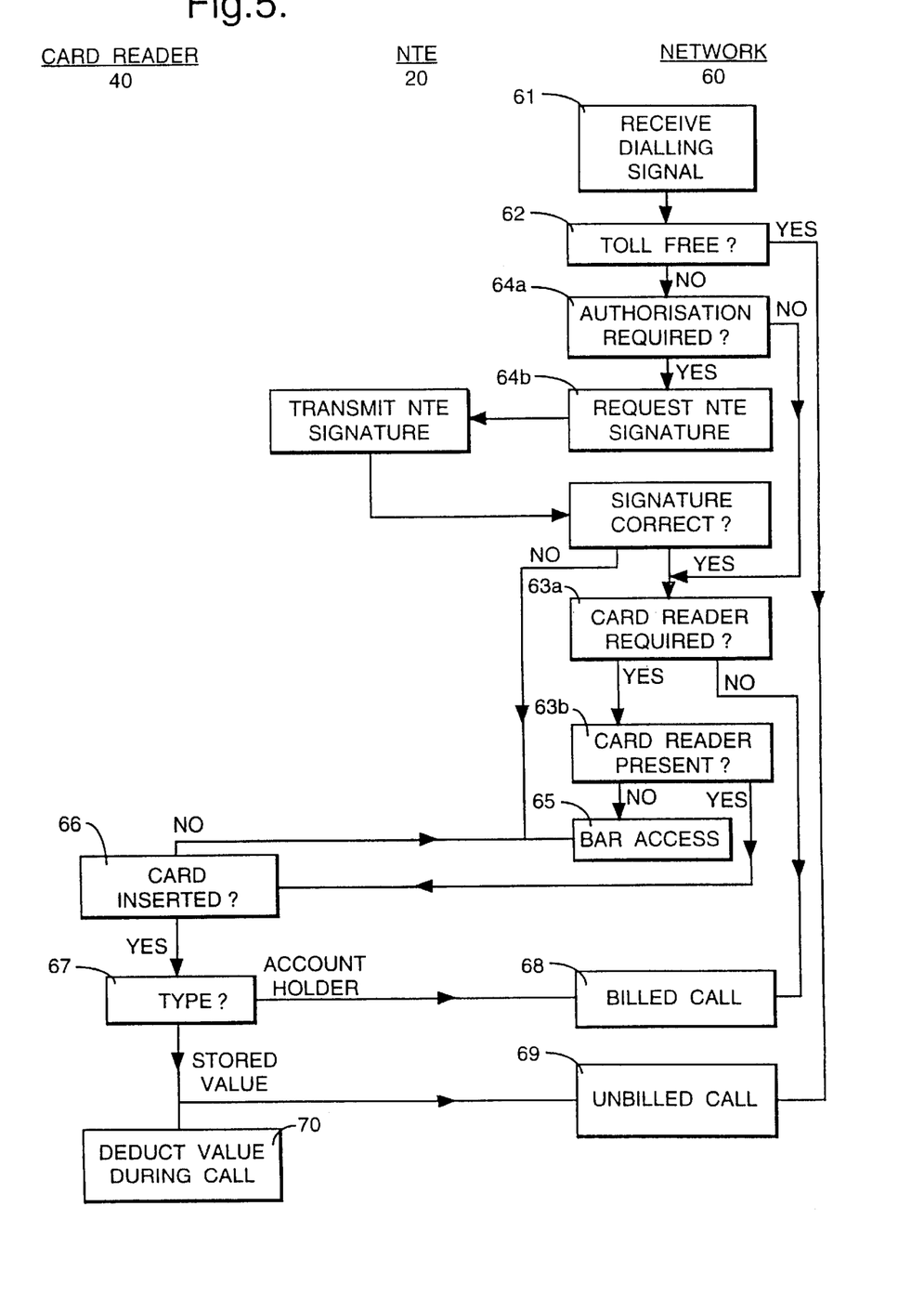
FIG. 5 is a flowchart showing the cooperation of a card-reader and a telecommunications network head end.

The card reader unit 40 of FIG. 5 can be connected to the card reader socket 1 of either of the embodiments described above. This module performs functions necessary to control access to the network, for use in circumstances where access to the telephone connection is to be restricted to certain users, or where pre-payment is required. The card reader unit 40 comprises a card reader including a slot 42 into which a card C can be inserted. The card reader cooperates with the network in the manner described below and illustrated with reference to FIG. 5.

In FIG. 5 the right hand side indicates the operations performed by the network and the left hand side those performed by the card reader module 40 and termination equipment 20. The network 60 first detects a call attempt 61 from the customer line. The network determines if the number is toll-free (step 62), and if it is, it permits the call to proceed irrespective of whether the module 40 has a card inserted or is indeed present at all. This is arranged so that the customer line can still be used to call the emergency services, or to contact the network operator should the card reader malfunction.

If the call attempt is not to a toll-free number the network 60 then checks with its database to determine whether the line is one on which authorization is required (step 64*a*) to check line integrity. If it is required the network 60 interrogates the termination equipment 20 for its line signature (step 64*b*). The termination 20 returns its signature (step 64*c*). The signature is compared with the signature stored by the network (step 64*d*). If an incorrect line signature is received (or no signature,) access to the network is barred (step 65).

If the line signature is correct or if authorization is not required, the network next checks with its database to determine if a card reader is required (step 63*a*). If not the call is treated as a normal billed call (step 68). If a card reader is required the network 60 checks for the presence of the right card reader 40 (step 63*b*). If the card reader is not present the network 60 prevents the call proceeding (step 65). If the card reader is present, the network 60 then prompts the card reader to make two checks. Firstly it ensures that a valid card is inserted (step 66) and prevents the call proceeding (step 65) if an invalid card, or no card at all, is inserted.

If the card is valid the reader then checks the card type (step 67). Two types are envisaged: stored value cards in which the cost of a call has been paid for in advance, and "account holder" cards for which the holder has an account with the telecommunications service provider, the account holder being invoiced for the call subsequently. Verification of the card may be required. This may be done by entering a private code number using the telephone keypad or a keypad attached to the card reader 40.

If the card is an 'account-holder' card the details of the account are transmitted to the network to process the call as a billed call (step 68). The account need not be that of the owner of the equipment. This allows a cardholder to use someone else's telephone without incurring expense for the host.

If the card is a 'stored-value' card the call proceeds as an unbilled call (step 69), the card reader deducting value from the card as the call proceeds (step 70). Digital display 43 can be used to display the value remaining on the card.

In all the embodiments above, electrical connections may be made by any known means. However, for ease of installation by unskilled users, it is preferable to use insulation displacement connectors for those connections intended to be usable by customers, and tamper-proof connections for any for which unauthorized access is to be restricted, such as the telemetry connection 3.

The embodiments described above are exemplary. The modules may include more or less functionality than in the embodiment described. For example the diagnostic and telemetry functionality 2, 3 could be provided by means of an add-on module instead of being incorporated in the base module 20 or intermediate unit 21.

We claim:

1. Telecommunications equipment, comprising a network termination equipment for forming the physical termination of a telecommunications network and providing a connection by which a user can access the network by use of telecommunications apparatus, the network termination equipment having:

first connection point for making connection with the head end of a telecommunications network, at least one second connection point for making connection with a telecommunications apparatus, operative means for generating signals for transmission to the head end, and a further connection arranged to allow the connection of different complementary elements, such that the topology of the connection of the elements can be varied to allow the network termination to perform different functions.

2. Telecommunications equipment according to claim 1 having means for signaling the presence of a complementary element to a telecommunications network through the first connection.

3. Telecommunications equipment comprising a complementary element for use with a network termination equipment according to claim 1, and having connections arranged such that when connected to the connections in the network termination equipment they form a complete connection between the first and second connection points.

4. Telecommunications equipment, comprising a combination of a network termination equipment according to claim 1 with a complementary element for use with a network termination equipment and having connections arranged such that when connected to the connections in the network termination equipment they form a complete connection between the first and second connection points.

5. Telecommunications equipment according to claim 3, wherein the complementary element includes additional components for allowing the network termination equipment to perform additional functions.

6. Telecommunications equipment according to claim 3, wherein the complementary element includes additional connection points for making connection with further telecommunications apparatus.

7. Telecommunications equipment according to claim 3, wherein the complementary element includes configuration means for reconfiguring the network termination equipment to perform additional functions.

8. Telecommunications equipment according to claim 7 wherein the configuration means comprises means for enabling or disabling one or more functional element of the network termination equipment.

9. Telecommunications equipment according to claim 3 wherein the complementary element has means for signaling its presence through the first connection to a telecommunications network.

10. Telecommunications equipment according to claim 1, wherein operative means are provided to prevent or detect unauthorized disconnection of telecommunications equipment from one or more of the second connection points.

11. Telecommunications equipment according to claim 1 wherein the operative means are responsive to control instructions received at the first connection point.

12. Telecommunications equipment according to claim 11, comprising means for transmitting control instructions to one of the second connection points in order to control a further equipment.

13. Telecommunications equipment according to claim 12 comprising means for receiving data from the further equipment generated in response to the control instructions, and transmitting the data from the first connection point.

14. Telecommunications equipment according to claim 11 wherein the apparatus is configured to interrogate and retrieve data from a meter.

15. A telephone network having connections between a head end and a plurality of terminations, at least one of the connections including a telecommunications equipment according to claim 1, the head end having means for identifying a call attempt from one of the terminations, means for identifying a characteristic signature transmitted from a network termination and means for enabling the call attempt only if the characteristic signature is present.

16. A telephone network according to claim 15, further comprising means for identifying whether a call attempt is in a predetermined permitted category, and means for enabling the call attempt if it is in that category irrespective of the presence or absence of the characteristic signature.

17. A telephone network according to claim 15 further comprising charging means for calculating call charges for billing to account holders, having means for responding to a signal from the telecommunications equipment identifying the type of user, and means for selectively activating the charging means for a first type of user only.

18. A telephone network according to claim 17, wherein telecommunications equipment includes a user identification means, having means for identifying a first type of user for which an account is held, and a second type of user to be charged at the point of use.

19. A telephone network according to claim 18, wherein the user identification means is a card reader.

20. A telephone network having a head end and a plurality of lines each leading from the head end to a network termination, at least one of the terminations having telecommunications equipment according to claim 1, the head end having means for signaling the operative means to set the network termination equipment into a predetermined state, and means to test the properties of the line leading to the network termination equipment by monitoring the signals generated by the network termination equipment.

21. A telecommunications network termination comprising:

a first housing with included first and second circuits, said first and second circuits each including at least some circuit branches that are not connected to each other internally of said first housing but which are connected to respectively corresponding portions of at least a first external connector;

a network connector internally connected to said first circuit and adapted for connection to a telecommunications network;

an apparatus connector internally connected to said second circuit and adapted for connection to a telecommunications apparatus; and a second housing with included third circuits having at least some branches connected to respectively corresponding portions of at least a second external connector that is plug-compatible with said at least first electrical connector;

said first and second housings with respective connectors being configured to plug together and thus interconnect said first and second circuits via said third circuits thereby effecting a combined circuit topography defined at least in part by said third circuit.

22. A telecommunications network termination as in claim 21 wherein said first circuit includes an active circuit capable of generating a signal onto said network connector in response to signals received from the network.

23. A telecommunications network termination as in claim 22 wherein said active circuit includes a no-ring circuit internally connected to a local telemetry connector for connection to local non-telephone equipment for data telemetry from such equipment.

24. A telecommunication network termination as in claim 21 wherein said third circuit includes only passive interconnect circuits.

25. A telecommunications network termination as in claim 21 wherein said third circuit includes active circuits connected to an additional services socket to provide additional telecommunication services for which said third circuits are especially adapted.

26. A telecommunications network termination as in claim 25 wherein said third circuit interconnecting said first and second circuits is one of plural predetermined third circuits, each such predetermined third circuit being adapted to provide respectively corresponding different additional telecommunication services and being separately housed in its own second housing, only one of said second housings and its included third circuit being plug-connected to said first housing at any one time.

27. A method of terminating a telecommunications network, said method comprising:

locating first and second circuits in a first housing, said first and second circuits each including at least some circuit branches that are not connected to each other internally of said first housing but which are connected to respectively corresponding portions of at least a first external connector;

providing a network connector internally connected to said first circuit and adapted for connection to a telecommunications network;

providing an apparatus connector internally connected to said second circuit and adapted for connection to a telecommunications apparatus; and locating third circuits in a second housing having at least some branches connected to respectively corresponding portions of at least a second external connector that is plug-compatible with said at least first electrical connector;

configuring said first and second housings with respective connectors to plug together and thus interconnect said first and second circuits via said third circuits thereby effecting a combined circuit topography defined at least in part by said third circuit.

28. A method as in claim 27 further comprising locating in said first circuit an active circuit capable of generating a signal onto said network connector in response to signals received from the network.

29. A method as in claim 28 further comprising locating a no-ring circuit as part of said active circuit and internally connected to a local telemetry connector for connection to local non-telephone equipment for data telemetry from such equipment.

30. A method as in claim 27 further comprising locating in said third circuit only passive interconnect circuits.

31. A method as in claim 27 further comprising locating in said third circuit active circuits connected to an additional services socket to provide additional telecommunication services for which said third circuits are especially adapted.

32. A method as in claim 31 further comprising providing said third circuit interconnecting said first and second circuits as one of plural predetermined third circuits, each such predetermined third circuit being adapted to provide respectively corresponding different additional telecommunication services and being separately housed in its own second housing, only one of said second housings and its included third circuit being plug-connected to said first housing at any one time.

* * * * *